US012791179B2

(12) United States Patent
Lo et al.

(10) Patent No.: US 12,791,179 B2
(45) Date of Patent: Nov. 10, 2026

(54) POOL LIGHTING ASSEMBLY WITH COILED CABLE

(71) Applicant: ZODIAC POOL SYSTEMS LLC, Carlsbad, CA (US)

(72) Inventors: Ricky Lo, Carlsbad, CA (US); Minas Minassian, Carlsbad, CA (US); Mark J. Bauckman, San Marcos, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

(21) Appl. No.: 19/203,142

(22) Filed: May 8, 2025

(65) Prior Publication Data

US 2025/0354682 A1 Nov. 20, 2025

Related U.S. Application Data

(60) Provisional application No. 63/649,061, filed on May 17, 2024.

(51) Int. Cl.

| | |
|---|---|
| ***F21V 27/00*** | (2006.01) |
| ***E04H 4/14*** | (2006.01) |
| ***F21S 8/02*** | (2006.01) |
| ***F21W 131/401*** | (2006.01) |

(52) U.S. Cl.

CPC ............. *F21V 27/00* (2013.01); *E04H 4/148* (2013.01); *F21S 8/024* (2013.01); *F21W 2131/401* (2013.01)

(58) Field of Classification Search

CPC .......................... E04H 4/148; F21W 2131/401

See application file for complete search history.

(56) References Cited

U.S. PATENT DOCUMENTS

| | | | | |
|---|---|---|---|---|
| D93,325 | S | 9/1934 | Berolzheimer | |
| 4,574,337 | A * | 3/1986 | Poppenheimer ...... | F21V 29/713 362/345 |
| D306,999 | S | 4/1990 | Moore et al. | |

(Continued)

FOREIGN PATENT DOCUMENTS

| | | | | |
|---|---|---|---|---|
| DE | 19952584 | A1 * | 5/2001 | .............. F21V 27/00 |
| WO | WO-2011141640 | A1 * | 11/2011 | ................ F21S 8/00 |
| WO | 2014170862 | A1 | 10/2014 | |

OTHER PUBLICATIONS

International Application No. PCT/US2025/028527, International Search Report and Written Opinion mailed on Oct. 17, 2025, 12 pages.

*Primary Examiner* — Alexander K Garlen

(74) *Attorney, Agent, or Firm* — Kilpatrick Townsend & Stockton LLP

(57) ABSTRACT

A pool system includes an underwater lighting assembly installed below a water line of a swimming pool or spa. A method of installing the lighting system in the swimming pool or spa includes guiding a lighting assembly cable through a conduit outlet of a wall fitting, into conduit, and up to a location of a pool transformer. The method includes coupling a lighting assembly with the wall fitting. The lighting assembly is connected to the lighting assembly cable, and a portion of the lighting assembly extends into the conduit. Guiding the lighting assembly cable includes positioning a pre-wound section of the lighting assembly cable with a plurality of turns within the conduit.

21 Claims, 5 Drawing Sheets

(56) References Cited

U.S. PATENT DOCUMENTS

| | | | | |
|---|---|---|---|---|
| 4,974,134 | A * | 11/1990 | Bourne .................. | F21V 23/00 362/802 |
| D330,192 | S | 10/1992 | Holland et al. | |
| 5,842,771 | A * | 12/1998 | Thrasher ................ | F21V 29/00 362/267 |
| D438,582 | S | 3/2001 | Speers et al. | |
| D530,671 | S | 10/2006 | Reed et al. | |
| 7,125,146 | B2 * | 10/2006 | Willis .................... | F21V 25/00 362/267 |
| D632,258 | S | 2/2011 | Sumida | |
| D790,475 | S | 6/2017 | Sheikh et al. | |
| 11,770,023 | B2 | 9/2023 | Stingu et al. | |
| 2004/0184263 | A1 * | 9/2004 | Patti ....................... | E01C 17/00 362/145 |
| 2006/0291197 | A1 * | 12/2006 | Patti ....................... | F21V 21/04 362/153.1 |
| 2022/0214020 | A1 | 7/2022 | Vogtner et al. | |

* cited by examiner

POOL LIGHTING ASSEMBLY WITH COILED CABLE

REFERENCE TO RELATED APPLICATION

This application claims the benefit of and priority to U.S. Provisional Patent Application No. 63/649,061, filed on May 17, 2024, and entitled POOL LIGHTING ASSEMBLY WITH COILED CABLE, the content of which is hereby incorporated by reference in its entirety.

FIELD OF THE INVENTION

The invention relates to immersed lighting assemblies principally for swimming pools and spas, and more particularly, but not necessarily exclusively, to lighting systems having improved installation and servicing properties.

BACKGROUND

Water within a swimming pool or spa sometimes may be illuminated by underwater lighting systems. As identified in U.S. Pat. No. 6,971,760 to Archer, et al., whose contents are incorporated in their entirety herein by this reference, existing underwater lighting systems may include those lighting assemblies that require a cavity or niche in the wall or surface of the pool below the waterline and those lighting systems where a niche does not need to be formed to provide the underwater pool light (also known as "nicheless" lighting assemblies).

Regardless of the type of lighting assembly for underwater lighting, electrical or optical cabling of the light assembly is directed through conduit and to a remote location outside of the pool to control circuitry, a transformer, a junction box, etc. During installation, servicing, and/or removal of the lighting systems, the lighting assembly may be pulled into the pool (i.e., away from the surface on which it is mounted), and slack in the cabling is provided above-ground and at the remote location due to size constraints of the conduit, particularly for nicheless lighting assemblies.

The amount of slack provided in the cable above-ground is decided and/or provided by the installer and thus may vary in a plurality of swimming pools or spas. Moreover, because this slack is dependent upon the installer, certain lighting assemblies, particularly nicheless lighting assemblies, may not have enough slack to pull the lighting assembly up out of the water to disconnect the cable, and the pool water level must be reduced. Installation of such lighting assemblies is time-consuming and/or labor intensive as such installations require activity at two locations—at the remote location to pull the slack in the cable back up to allow for installation and also at the wall or surface of the pool to finally install the lighting assembly.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a method of installing a lighting system in a swimming pool or spa includes guiding a lighting assembly cable through a conduit outlet of a wall fitting, into conduit, and up to a location of a pool transformer. In some embodiments, the wall fitting is below a water line within a swimming pool or spa. The method includes coupling a lighting assembly with the wall fitting. The lighting assembly is connected to the lighting assembly cable, and a portion of the lighting assembly extends into the conduit. Guiding the lighting assembly cable includes positioning a pre-wound section of the lighting assembly cable comprising a plurality of turns within the conduit.

According to some embodiments, a method of servicing a lighting system of a swimming pool or spa includes uncoupling a lighting assembly from a wall fitting below a water line within the swimming pool or spa, and applying a force pulling the lighting assembly from the wall fitting into the swimming pool or spa. In certain embodiments, applying the force includes extending a pre-wound lighting assembly cable comprising a plurality of turns and connected to the lighting assembly from a contracted state to an extended state. The lighting assembly cable is configured to return to the contracted state in an absence of the force.

According to various embodiments, an underwater pool lighting system includes a lighting assembly with at least one light source and a lighting assembly cable connected to the lighting assembly. The lighting assembly cable includes a straight portion and a pre-wound portion, and the pre-wound portion includes a plurality of turns.

According to certain embodiments, an underwater pool lighting system includes a lighting assembly with at least one light source and a lighting assembly cable connected to the lighting assembly. The lighting assembly cable includes a pre-wound portion with a plurality of turns, and the pre-wound portion is movable between a contracted state and an extended state. A length of the pre-wound portion in the extended state is greater than the length of the pre-wound portion in the contracted state, and the pre-wound portion is configured to be in the contracted state when unloaded or in an absence of a force.

According to some embodiments, an underwater pool lighting system includes a lighting assembly with at least one light source and a lighting assembly cable connected to the lighting assembly. The lighting assembly cable includes a pre-wound portion comprising a plurality of turns, and the pre-wound portion is movable between a contracted state and an extended state. In some embodiments, the plurality of turns comprise a first transverse dimension in the contracted state and a second transverse dimension in the extended state, and the first transverse dimension is greater than the second transverse dimension. The pre-wound portion may be configured to retract to the contracted state when unloaded.

According to various embodiments, an underwater pool lighting system includes a lighting assembly includes at least one light source and a lighting assembly cable connected to the lighting assembly. The lighting assembly cable includes a straight portion and a pre-wound portion, and the pre-wound portion comprises a plurality of turns. In certain cases, the lighting assembly cable includes a cable connector connecting the lighting assembly cable to the lighting assembly.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DESCRIPTION OF THE INVENTION

Described herein are systems and methods for providing underwater lighting in a swimming pool or spa. In certain embodiments, the systems and methods described herein may allow for improved access to a lighting assembly for installation, servicing, and/or removal without requiring draining of the pool to reduce a water level. In various embodiments, the systems and methods described herein may allow for extension of a lighting assembly and lighting assembly cable without necessarily requiring above-ground slack in the lighting assembly cable. The systems and methods described herein may be suitable for various underwater lighting systems, and may be particularly suitable for nicheless lighting systems. The systems and methods described herein additionally or alternatively may provide improved installation and/or positioning of a lighting assembly with a lighting assembly cable that is biased toward or into a wall or niche for niched lighting systems or toward or into a conduit for nicheless lighting systems.

In various embodiments, the systems and methods described herein including a lighting assembly and a lighting assembly cable. The lighting assembly cable includes a pre-wound section with a plurality of turns. The pre-wound section may be adjustable between a contracted state, in which the pre-wound section has a first length, and an extended state, in which the pre-wound section has a second length greater than the first length. The pre-wound section may be biased into the contracted state and/or have a natural or unloaded state in which the pre-wound section is contracted. In some embodiments, the lighting assembly cable includes one or more straight or unwound sections. In certain embodiments, the pre-wound section may have a maximum transverse dimension (e.g., a diameter) such that the lighting assembly cable is positionable within conduit of the swimming pool or spa for nicheless lighting systems. In certain embodiments, the maximum transverse dimension may be less than or equal to 1.5 inches.

The systems and methods described herein may improve the efficiency of installing, servicing, and/or removing of the lighting assembly from an underwater location within a swimming pool or spa compared to traditional approaches. Optionally, the improved installation, servicing, and/or removal may be realized without requiring additional components. Various other benefits and advantages may be realized with the systems, devices, and methods provided herein, and the aforementioned advantages should not be considered limiting.

FIGS. 1-9 illustrate an example of a pool system 10 according to various embodiments. The pool system 10 generally includes a pool or spa 12 (hereinafter "pool 12") with one or more submerged surfaces 14. Submerged surfaces 14 include but are not limited to pool walls 16, floors, steps, beaches, benches, combinations thereof, and/or as otherwise desired.

Figure 1:
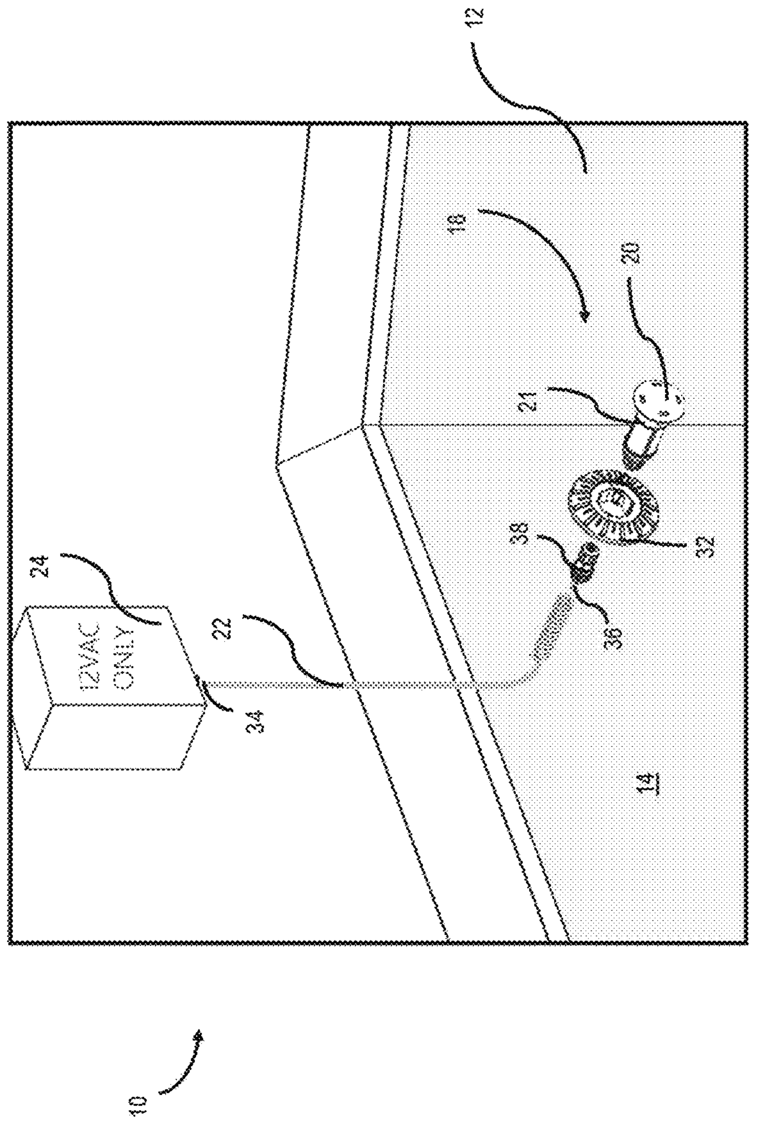
FIG. 1 illustrates a pool system with a lighting system according to embodiments.

As illustrated in FIG. 1, in certain embodiments, the pool system 10 includes one or more lighting systems 18 for providing light or illumination underwater. The lighting system 18 generally includes a lighting assembly 20, a lighting assembly cable 22, and control circuitry 24 (e.g., transformer, junction box, etc.) The lighting system 18 may be various types of lighting systems as desired, such as niched lighting systems or nicheless lighting systems as desired. In certain embodiments, at least a portion of the lighting system 20, such as but not limited to a portion of the lighting assembly 20, may be exposed and/or in contact with water of the pool 12 when the lighting system 18 is installed in the pool 12.

Figure 2:
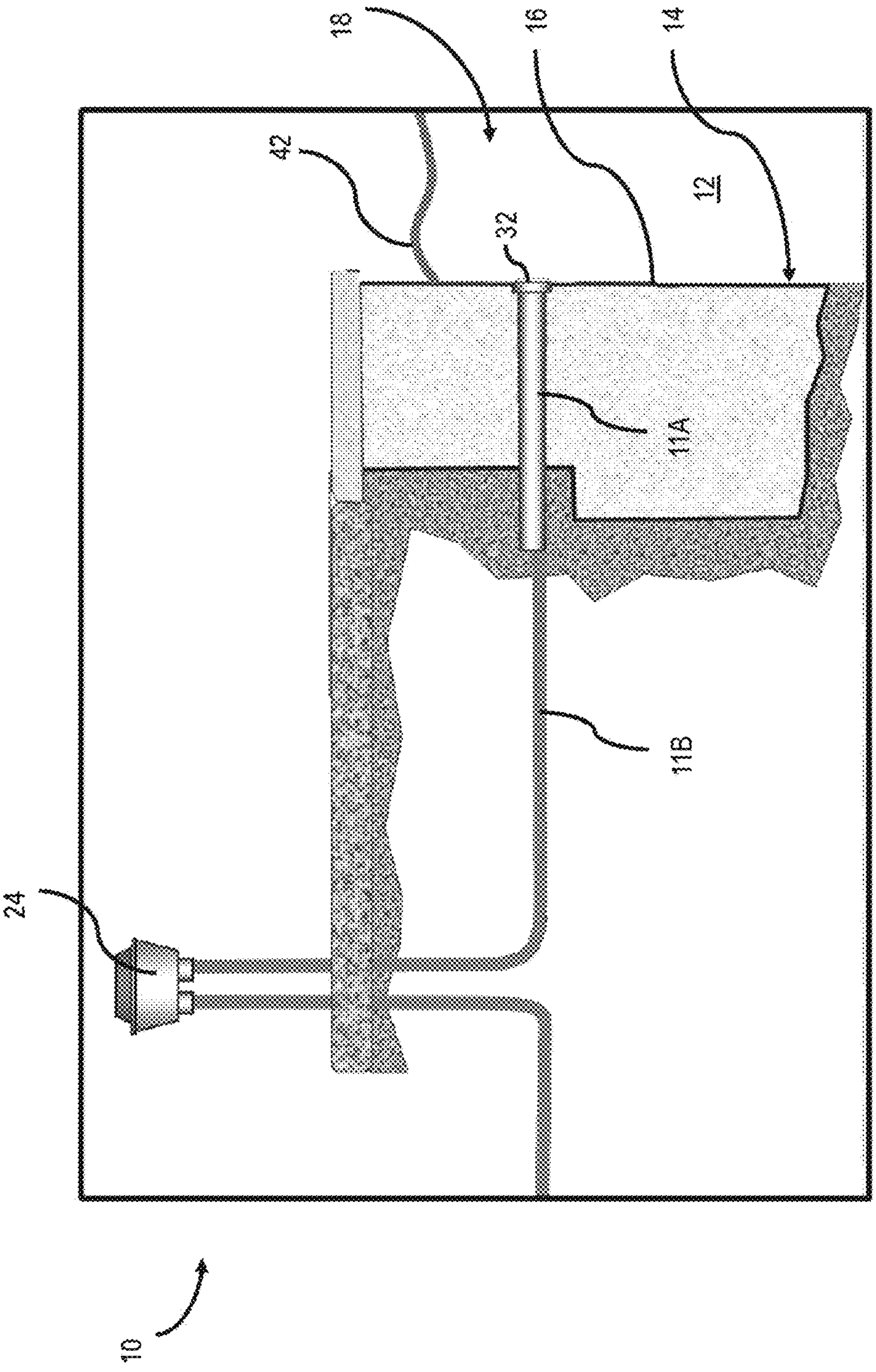
FIG. 2 is another view of the pool system of FIG. 1 according to embodiments.
Figure 3:
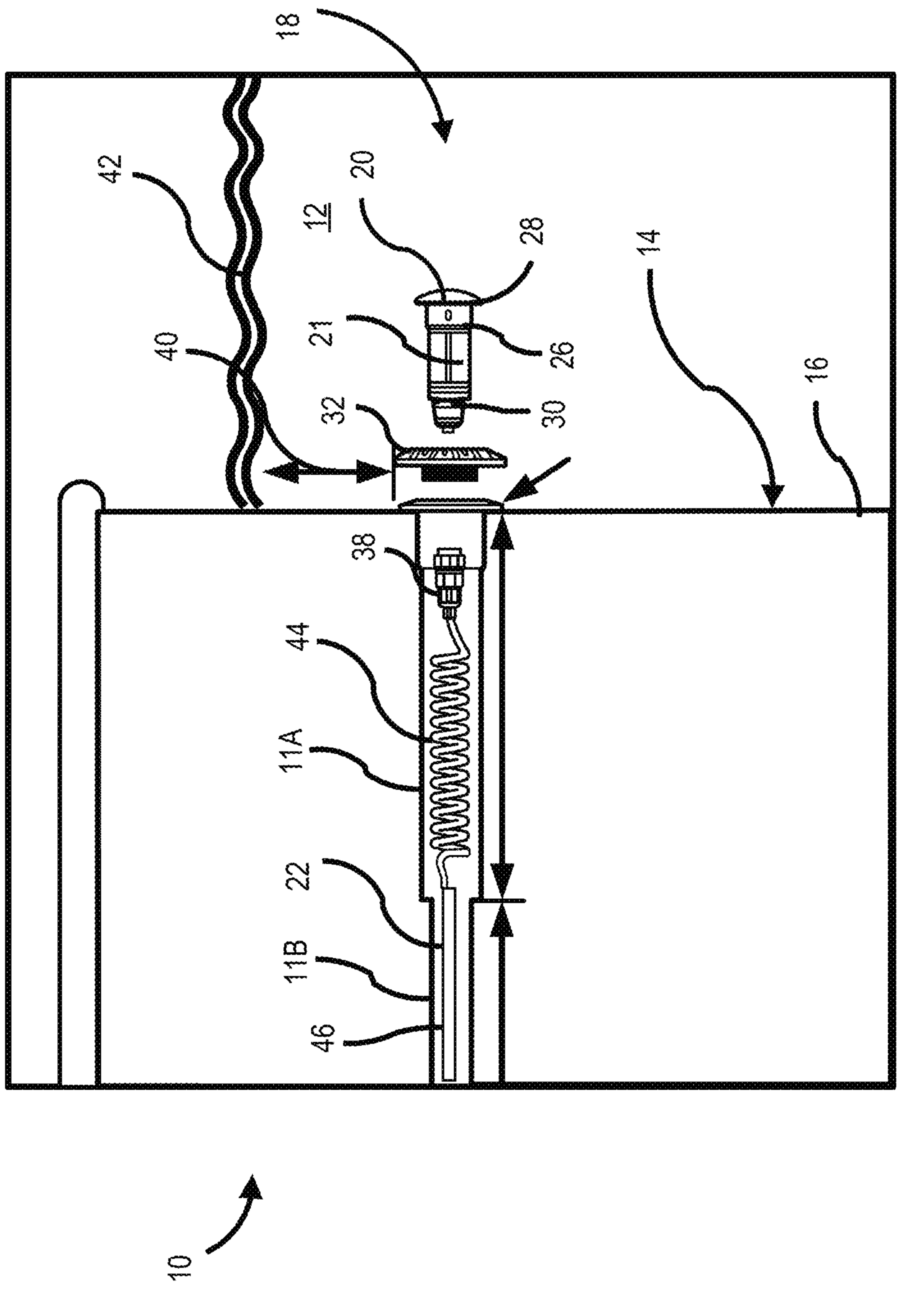
FIG. 3 illustrates a portion of the pool system of FIG. 1 according to embodiments.
Figure 4:
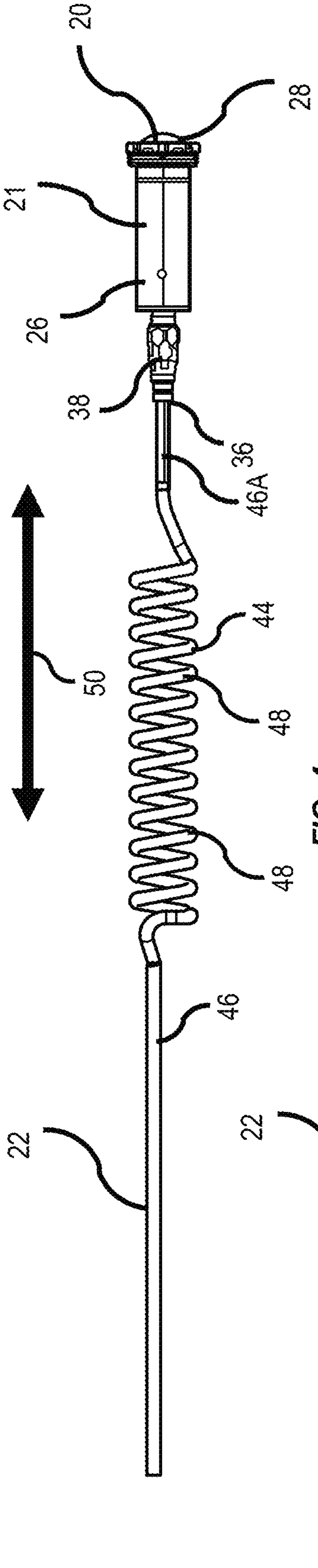
FIG. 4 illustrates the lighting system of FIG. 1 according to embodiments.
Figure 5:
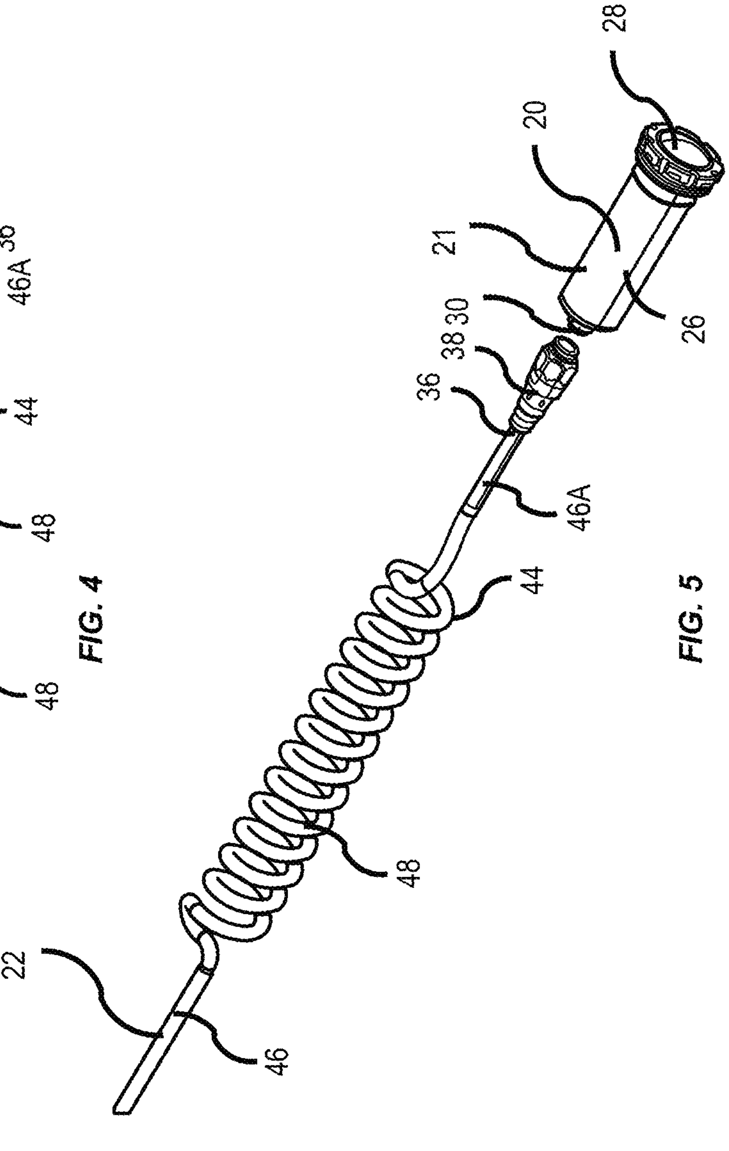
FIG. 5 is a partially exploded view of the lighting system of FIG. 1 according to embodiments.

In the embodiment illustrated in FIGS. 1-9, the lighting system 18 is a nicheless lighting system, and the lighting assembly 20 is a nicheless lighting assembly 21. In this embodiment, and as best illustrated in FIGS. 2 and 3, the pool 12 includes pipe or conduit 11 terminating at the surface 14 and for at least partially receiving the nicheless lighting assembly 21. Optionally, the conduit 11 includes a first conduit 11A and a second conduit 11B. In these embodiments, the first conduit 11A may terminate at the surface 14, and the second conduit 11B may extend towards the control circuitry 24. The first conduit 11A and the second conduit 11B may each have an inner transverse dimension (e.g., a diameter), and the inner transverse dimension of the second conduit 11B may be less than the inner transverse dimension of the first conduit 11A. In embodiments with the nicheless lighting assembly 21, the inner transverse dimension of the first conduit 11A may be various dimensions, and in some non-limiting examples may be less than or equal to 1.5 inches. In some embodiments, the first conduit 11A may have a minimum length, optionally which may be based on a wattage of the lighting assembly 20 and/or an inner transverse dimension of the first conduit 11A. As non-limiting examples, the first conduit 11A may have a minimum length of at least 7 inches and/or at least 10 inches for the first conduit 11A having an inner transverse dimension of 1.5 inches or less. In one non-limiting example, the first conduit 11A may have a minimum length of at least 7 inches and/or at least 10 inches and an inner transverse dimension of 1.5 inches, and the second conduit 11B may have an inner transverse dimension of 1 inch.

The conduit 11 may be provided at various locations as desired, and in certain embodiments, the conduit 11 is provided at a minimum distance 40 relative to a water level 42. In some embodiments, the minimum distance 40 may be at least 4 inches from the water level 42; however, in other embodiments, the minimum distance 40 may be other distances as desired.

In certain embodiments, the nicheless lighting assembly 21 generally includes a housing 26, a lens 28, and a connector 30 for engaging the lighting assembly cable 22. A light source, such as one or more light emitting diodes, may be provided within the housing 26 such that light may be emitted through the lens 28 and into the pool 12. Optionally, the nicheless lighting assembly 21 includes other components such as but not limited to a heat spreader, printed circuit board(s), gasket, potting material, combinations thereof, and/or other components as desired. Optionally, the nicheless lighting assembly 21 includes a wall mount or fitting 32 for holding the nicheless lighting assembly 21 in place on the surface 14 of the pool 12. In other embodiments, the wall fitting 32 may be omitted, and the nicheless lighting assembly 21 may be mounted directly into the surface 14 of the pool 12. As mentioned, in some embodiments, at least a portion of the lighting assembly 21 may be exposed to and/or in contact with water of the pool 12 when the lighting assembly 21 is installed in the pool 12. As a non-limiting example, at least a portion of the lens 28 and/or the wall fitting 32 may be exposed to and/or in contact with water of the pool 12.

In other embodiments, the nicheless lighting assembly 21 may have fewer or additional components as desired, and in other embodiments may have other constructions compared to that of the nicheless lighting assembly 21. As non-limiting examples, the nicheless lighting assembly 21 may be similar to those described in U.S. Pat. No. 11,035,564 to Arpin et al., ("Arpin"), issued on Jun. 15, 2021, and U.S. Pat. No. 6,971,760 to Archer et al. ("Archer"), issued on Dec. 6, 2005, both of which are hereby incorporated by reference in their entireties.

As illustrated in FIGS. 1 and 2, the control circuitry 24 of the lighting system 18 may be provided at a location remote from the pool 12 and outside the pool 12. The control circuitry 24 may be various components or devices as desired, such as but not limited to junction boxes, transformers, combinations thereof, and/or as otherwise desired.

The lighting assembly cable 22 connects the lighting assembly 20 with the control circuitry 24 and extends at least partially through the conduit 11. The lighting assembly cable 22 may be various types of wiring or cabling as desired, such as but not limited to electrical cabling, optical cabling, etc. As illustrated in FIG. 1, one end 34 of the lighting assembly cable 22 may be connected to the control circuitry 24. An opposing end 36 optionally includes an adapter or connector 38 for engaging the connector 30 of the lighting assembly 20. However, in other embodiments, the connectors 30, 38 may be omitted, and the lighting assembly 20 may be hardwired with the lighting assembly cable 22.

As best illustrated in FIGS. 4-9, the lighting assembly cable 22 generally includes a pre-wound section 44 and one or more straight or unwound sections 46. The pre-wound section 44 may be provided proximate to end 36 such that the pre-wound section 44 is positionable within the first conduit 11A when the lighting assembly cable 22 is installed. Optionally, an unwound section 46A may be provided between the pre-wound section 44 and the end 36, although in other embodiments the pre-wound section 44 may include the end 36.

The pre-wound section 44 includes a plurality of turns 48, the number of which should not be considered limiting. The pre-wound section 44 includes the turns 48 pre-formed or pre-defined such that the turns 48 are automatically provided and/or are present in a natural or unloaded state of the lighting assembly cable 22. Reference to the sections 46 being "straight" or "unwound" does not mean that the sections 46 must be straight, and instead only refers to sections of the lighting assembly cable 22 in which turns 48 are not pre-formed, pre-defined, and/or automatically present in a natural or unloaded state.

The turns 48 may have various shapes as desired. In some embodiments, and as best illustrated in FIGS. 4-6 and 9, the turns 48 may have a circular or ring shape. In other embodiments, the turns 48 may have other shapes such as but not limited to rectangular shapes, triangular, and/or other shapes or combination of shapes as desired. In some embodiments, the turns 48 may have a same transverse dimension (e.g., diameter), although in other embodiments the transverse dimensions need not be the same. Similarly, the pitch or spacing between adjacent turns 48 may be various pitches or spacings as desired. In some embodiments, the pitch between adjacent turns 48 of the plurality of turns 48 may be substantially the same along the length of the pre-wound section 44, although they need not be the same in other embodiments.

Figure 7:
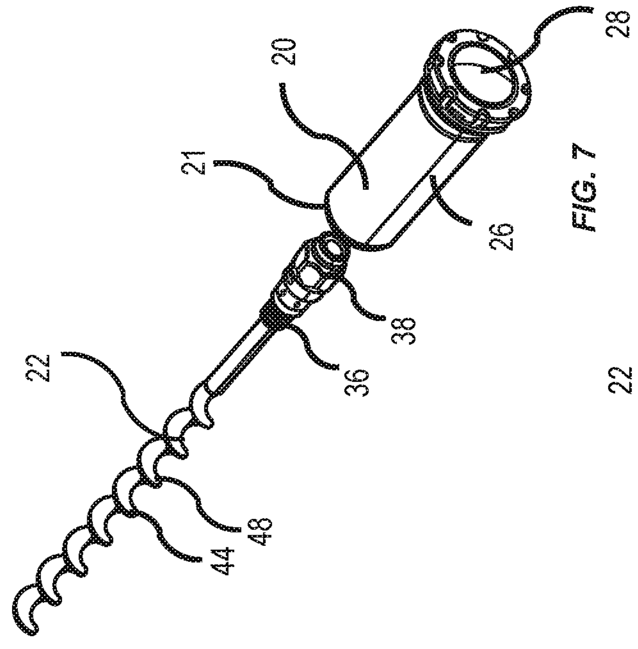
FIG. 7 is a perspective view of the lighting system of FIG. 1 in an extended state according to embodiments.

In various embodiments, the pre-wound section 44 is adjustable (represented by arrow 50 in FIG. 4) between a contracted state (FIGS. 4-6) and an extended state (FIG. 7). In the contracted state, the pre-wound section 44 has a first transverse dimension (as defined by the turns 48) and a first length. In embodiments where the pre-wound section 44 includes a plurality of transverse dimensions, the first transverse dimension refers to a maximum transverse dimension in the contracted state. In the extended state, the pre-wound section 44 has a second transverse dimension (as defined by the turns 48) and a second length. In embodiments where the pre-wound section 44 includes a plurality of transverse dimensions, the second transverse dimension refers to a maximum transverse dimension in the extended state.

Figure 9:
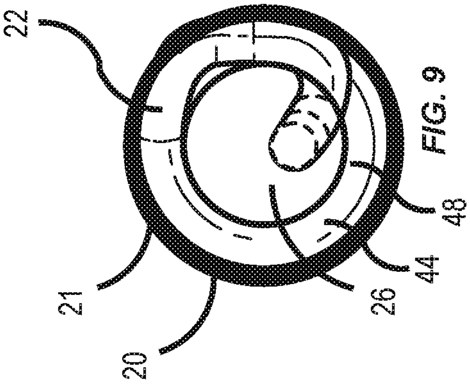
FIG. 9 is another end view of the lighting system of FIG. 1 according to embodiments.
Figure 6:
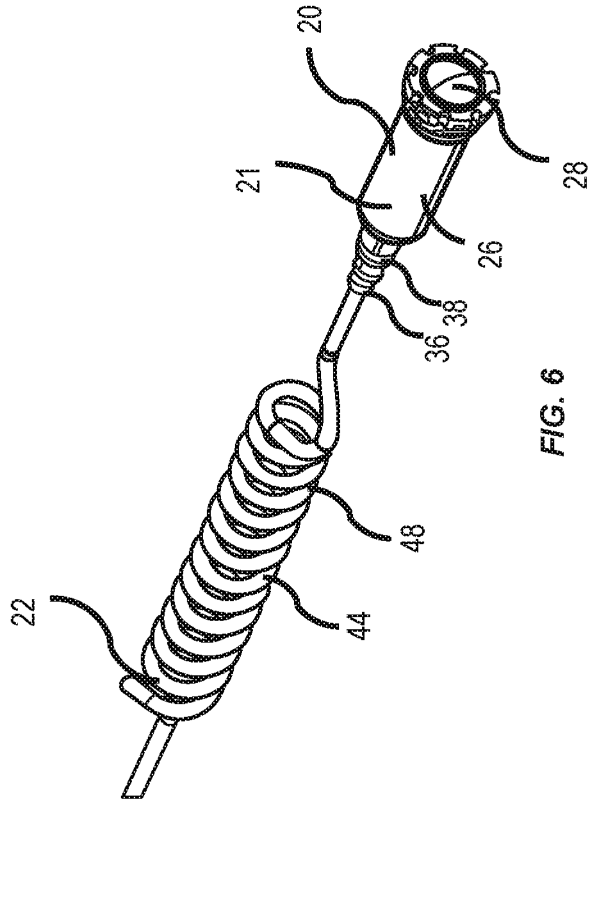
FIG. 6 is a perspective view of the lighting system of FIG. 1 in a contracted state according to embodiments.
Figure 8:
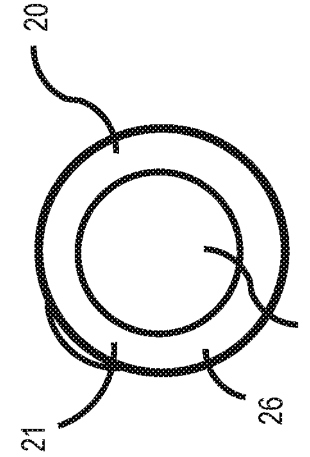
FIG. 8 is an end view of the lighting system of FIG. 1 according to embodiments.

In some embodiments, the first transverse dimension is greater than the second transverse dimension, and the second length is greater than the first length. In some embodiments, the first transverse dimension is less than the inner transverse dimension of the first conduit 11A. A s a non-limiting example, the first transverse dimension of the pre-wound section 44 in the contracted state is less than 1.5 inches. In one non-limiting example, the first transverse dimension may be greater than or equal to 0.5 inches to less than 1.5 inches. Optionally, and as best illustrated in FIGS. 9 and 10, the first transverse dimension may be less than or substantially equal to a maximum transverse dimension of the lighting assembly 20.

In certain embodiments, the first length of the pre-wound section 44 in the contracted state is less than the length of the first conduit 11A, although in other embodiments the first length may be any length as desired. In non-limiting examples, the first length may at least 4 inches, such as at least 7 inches, such as at least 10 inches. The second length of the pre-wound section 44 in the extended state may be sufficient such that end 36 (and thus the lighting assembly 20) may be positioned above the water level 42 without having to drain and lower the water level in the pool 12. Optionally, the second length is at least 4 inches.

In certain embodiments, the contracted state of the pre-wound section 44 may be the natural state of the pre-wound section 44 and the pre-wound section 44 is biased/tensioned to return, retract, or otherwise be in the contracted state when unloaded or in an absence of a force. As a non-limiting example, after the pre-wound section 44 has been moved to the extended state (e.g., due to a user pulling on the lighting assembly 20), the pre-wound section 44 may automatically return and retract back to the contracted state upon being released by the user.

The lighting assembly cable 22 with the pre-wound section 44 may facilitate installation, servicing, and/or removal of the lighting assembly 20 in the pool system 10. The lighting assembly cable 22 with the pre-wound section 44 may also avoid a need for above-ground slack, which may be unsightly and/or be a safety hazard. In other embodiments, the pre-wound section 44 may be utilized in conjunction with above-ground slack.

In various embodiments, the pre-wound section 44 may facilitate installation by guiding the light assembly 20 into the conduit 11A and/or close proximity to the wall fitting 32 while the opposing end 34 is guided through the conduit 11. As an example, a method of installing the lighting system 18 may include guiding the end 34 of the lighting assembly cable 22 through an outlet of the conduit 11, into the conduit 11, and up to the location of the control circuitry 24. Optionally, the method includes connecting the lighting assembly 20 with the lighting assembly cable 22 before the end 36 of the lighting assembly cable 22 is submerged (e.g., due to pulling on the lighting assembly cable 22). Guiding the lighting assembly cable 22 through the conduit 11 includes positioning the pre-wound section 44 within the first conduit 11A. In certain embodiments, the pre-wound section 44 may provide a stop and abut the second conduit 11B, although it need not in other embodiments. In certain embodiments, the pre-wound section 44 biased toward its contracted state facilitates positioning of the lighting assembly 20 at least partially within the conduit 11A and/or on the surface 14. Optionally, guiding the pre-wound section 44 into the conduit 11A may include partially compressing the pre-wound section 44.

The pre-wound section 44 may facilitate servicing and/or removal of the lighting assembly 20 by allowing for removal of the lighting assembly 20 above the water level 42 without requiring a lowering of the water level 42 and/or without disconnecting the lighting assembly cable 22 from the control circuitry 24. In certain embodiments, the pre-wound section 44 may allow for servicing and/or removal of the lighting assembly 20 while maintaining the minimum distance 40. As a non-limiting example, a method of servicing and/or removing the lighting assembly 20 from the pool 12 may include uncoupling the lighting assembly 20 from the wall fitting 32 and/or the surface 14. In embodiments wherein the pre-wound section 44 is partially compressed when installed, uncoupling the lighting assembly 20 allows for expansion or extension of the pre-wound section 44, which may apply a force at least partially ejecting or otherwise positioning the lighting assembly 20 relative to the surface 14. The method includes applying a force pulling the lighting assembly 20 from the wall fitting 32 and/or the surface 14 into the pool 12. In various embodiments, applying the force includes causing the pre-wound section 44 to adjust from the contracted state to the extended state, which in turn allows for the end 36 and/or the lighting assembly 18 to be positioned above the water. Optionally, upon a removal of the force, the pre-wound section 44 automatically returns to the contracted state.

Various other benefits and advantages may be realized with the systems, devices, and methods provided herein, and the aforementioned advantages should not be considered limiting.

Exemplary concepts or combinations of features of the invention may include:

A. A method of installing a lighting system in a swimming pool or spa, the method comprising:
   - i. guiding a lighting assembly cable through a conduit outlet of a wall fitting, into conduit, and up to a location of a pool transformer, wherein the wall fitting is below a water line within a swimming pool or spa; and
   - ii. coupling a lighting assembly with the wall fitting, wherein the lighting assembly is connected to the lighting assembly cable, and wherein a portion of the lighting assembly extends into the conduit,
   - iii. wherein guiding the lighting assembly cable comprises positioning a pre-wound section of the lighting assembly cable comprising a plurality of turns within the conduit.

B. A method of servicing a lighting system of a swimming pool or spa, the method comprising:
   - i. uncoupling a lighting assembly from a wall fitting below a water line within the swimming pool or spa; and
   - ii. applying a force pulling the lighting assembly from the wall fitting into the swimming pool or spa, wherein applying the force comprises extending a pre-wound lighting assembly cable comprising a plurality of turns and connected to the lighting assembly from a contracted state to an extended state, wherein the lighting assembly cable is configured to return to the contracted state in an absence of the force.

C. An underwater pool lighting system comprising:
   - i. a lighting assembly comprising at least one light source; and
   - ii. a lighting assembly cable connected to the lighting assembly, wherein the lighting assembly cable comprises a straight portion and a pre-wound portion, wherein the pre-wound portion comprises a plurality of turns.

D. An underwater pool lighting system comprising:
   - i. a lighting assembly comprising at least one light source; and
   - ii. a lighting assembly cable connected to the lighting assembly, wherein the lighting assembly cable comprises a pre-wound portion comprising a plurality of turns, wherein the pre-wound portion is movable between a contracted state and an extended state, wherein a length of the pre-wound portion in the extended state is greater than the length of the pre-wound portion in the contracted state, and wherein the pre-wound portion is configured to be in the contracted state when unloaded or in an absence of a force.

E. An underwater pool lighting system comprising:
   - i. a lighting assembly comprising at least one light source; and
   - ii. a lighting assembly cable connected to the lighting assembly, wherein the lighting assembly cable comprises a pre-wound portion comprising a plurality of turns, wherein the pre-wound portion is movable between a contracted state and an extended state, wherein the plurality of turns comprise a first transverse dimension in the contracted state and a second transverse dimension in the extended state, wherein the first transverse dimension is greater than the second transverse dimension, and wherein the pre-wound portion is configured to retract to the contracted state when unloaded.

F. The method or underwater pool lighting system of any preceding or subsequent statement or combination of statements, wherein guiding the pre-wound section into the conduit may include partially compressing the pre-wound section.

G. The method or underwater pool lighting system of any preceding or subsequent statement or combination of statements, wherein, in the contracted state, the plurality of turns have a same transverse dimension.

H. The method or underwater pool lighting system of any preceding or subsequent statement or combination of statements, wherein a pitch between adjacent turns of the plurality of turns is substantially the same.

I. The underwater pool lighting system of any preceding or subsequent statement or combination of statements, wherein the plurality of turns are circular, triangular, or rectangular.

J. The underwater pool lighting system of any preceding or subsequent statement or combination of statements, wherein the lighting assembly cable is an electrical cable.

K. The method or underwater pool lighting system of any preceding or subsequent statement or combination of statements, wherein the lighting assembly cable is an optical cable.

L. The method or underwater pool lighting system of any preceding or subsequent statement or combination of statements, wherein, in the contracted state, the transverse dimension of the pre-wound portion is less than or equal to 1.5 inches.

M. The method or underwater pool lighting system of any preceding or subsequent statement or combination of statements, wherein, in the contracted state, the transverse dimension of the pre-wound portion is from greater than or equal to 0.5 inches to less than or equal to 1.5 inches.

N. The method or underwater pool lighting system of any preceding or subsequent statement or combination of statements, wherein a length of the pre-wound portion is at least 7 inches.

O. The method or underwater pool lighting system of any preceding or subsequent statement or combination of statements, wherein a length of the pre-wound portion is at least 10 inches.

P. The method or underwater pool lighting system of any preceding or subsequent statement or combination of statements, further comprising:
  i. a wall fitting; and
  ii. conduit, wherein at least the pre-wound portion of the lighting assembly cable is within the conduit.

Q. The method or underwater pool lighting system of any preceding or subsequent statement or combination of statements, wherein the conduit is a first conduit having a first diameter, wherein the underwater pool lighting system further comprises a second conduit for receiving a straight portion of the lighting assembly cable, wherein an inner diameter of the second conduit is less than an inner diameter of the first conduit.

R. The method or underwater pool lighting system of any preceding or subsequent statement or combination of statements, wherein the inner diameter of the first conduit is 1.5 inches and wherein the inner diameter of the second conduit is 1 inch.

S. The method or underwater pool lighting system of any preceding or subsequent statement or combination of statements, wherein the lighting assembly is a nicheless lighting assembly.

T. A swimming pool or spa comprising the underwater pool lighting system of any preceding or subsequent statements or combination of statements, wherein the lighting assembly is at least 4 inches below a water line of the swimming pool or spa.

U. The method or underwater pool lighting system of any preceding or subsequent statement or combination of statements, wherein the lighting assembly cable comprises a cable connector at an end of the lighting assembly cable, and wherein the cable connector is configured to engage the lighting assembly such that the lighting assembly is detachable from the lighting assembly cable.

V. The method or underwater pool lighting system of any preceding or subsequent statement or combination of statements, wherein the lighting assembly comprising a lighting assembly connector configured to engage the cable connector.

W. The method or underwater pool lighting system of any preceding or subsequent statement or combination of statements, wherein the lighting assembly connector is spaced apart from a housing of the lighting assembly.

X. The method or underwater pool lighting system of any preceding or subsequent statement or combination of statements, wherein the lighting assembly connector is spaced apart from a housing of the lighting assembly by a cable.

Y. The method or underwater pool lighting system of any preceding or subsequent statement or combination of statements, wherein the lighting assembly connector is on a housing of the lighting assembly.

Z. An underwater pool lighting system comprising:
  i. a lighting assembly comprising at least one light source; and
  ii. a lighting assembly cable connected to the lighting assembly, wherein the lighting assembly cable comprises a straight portion and a pre-wound portion, wherein the pre-wound portion comprises a plurality of turns, and wherein the lighting assembly cable further comprises a cable connector connecting the lighting assembly cable to the lighting assembly.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Further, although applicant has described devices and techniques for use principally with swimming pools or spas, persons skilled in the relevant field will recognize that the present invention conceivably could be employed in connection with other water containing vessels and in other manners, particularly but not limited to underwater installations. Finally, references to “pools” and “swimming pools” herein may also refer to spas or other water containing vessels used for recreation, training, or therapy.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements. As used herein, the meaning of "a," "an," and "the" includes singular and plural references unless the context clearly dictates otherwise.

The above-described aspects are merely possible examples of implementations, merely set forth for a clear understanding of the principles of the present disclosure. M any variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of installing a lighting system in a swimming pool or spa, the method comprising:

guiding a lighting assembly cable through a conduit outlet of a wall fitting, into conduit, and up to a location of a pool transformer, wherein the wall fitting is below a water line within a swimming pool or spa; and coupling a lighting assembly with the wall fitting, wherein the lighting assembly is connected to the lighting assembly cable, and wherein a portion of the lighting assembly extends into the conduit, wherein guiding the lighting assembly cable comprises positioning a pre-wound section of the lighting assembly cable comprising a plurality of turns within the conduit, wherein the plurality of turns are axially aligned and biased in a contracted state in an installed position.

2. The method of claim 1, wherein guiding the pre-wound section into the conduit may include partially compressing the pre-wound section.

3. The method of claim 1, wherein the pre-wound section is movable between the contracted state and an extended state, wherein a length of the pre-wound section in the extended state is greater than the length of the pre-wound section in the contracted state, wherein the pre-wound section is configured to be in the contracted state when unloaded or in an absence of a force, and wherein guiding the pre-wound section into the conduit comprises moving the pre-wound section from the extended state to the contracted state.

4. The method of claim 1, wherein coupling a lighting assembly with the wall fitting comprises coupling the lighting assembly at a location within the swimming pool or spa at least 4 inches below the water line of the swimming pool or spa.

5. A method of servicing a lighting system of a swimming pool or spa, the method comprising:

uncoupling a lighting assembly from a wall fitting below a water line within the swimming pool or spa; and applying a force pulling the lighting assembly from the wall fitting into the swimming pool or spa, wherein applying the force comprises extending a pre-wound lighting assembly cable comprising a plurality of turns axially aligned and further connected to the lighting assembly from a contracted state to an extended state; and recoupling the lighting assembly to the wall fitting, wherein the pre-wound lighting assembly cable is configured to return to the contracted state in an absence of the force, the plurality of turns are axially aligned and biased in the contracted state.

6. An underwater pool lighting system comprising:

a lighting assembly comprising at least one light source; and a lighting assembly cable connected to the lighting assembly, wherein the lighting assembly cable comprises a straight portion and a pre-wound portion, wherein the pre-wound portion comprises a plurality of turns, wherein the pre-wound portion is movable between a contracted state and an extended state, wherein, in the contracted state, the plurality of turns are axially aligned, and wherein the pre-wound portion is biased into the contracted state.

7. The underwater pool lighting system of claim 6, wherein a length of the pre-wound portion in the extended state is greater than the length of the pre-wound portion in the contracted state, and wherein the pre-wound portion is biased into the contracted state with a force sufficient to reposition the lighting assembly.

8. The underwater pool lighting system of claim 6, wherein the plurality of turns comprise a first transverse dimension in the contracted state and a second transverse dimension in the extended state, wherein the first transverse dimension is greater than the second transverse dimension.

9. The underwater pool lighting system of claim 8, wherein, in the contracted state, the plurality of turns have a same transverse dimension.

10. The underwater pool lighting system of claim 6, wherein the plurality of turns comprise a first transverse dimension in the contracted state and a second transverse dimension in the extended state, wherein the first transverse dimension is greater than the second transverse dimension, wherein, in the contracted state, the first transverse dimension of the pre-wound portion is less than or equal to 1.5 inches.

11. The underwater pool lighting system of claim 6, wherein a length of the pre-wound portion is at least 7 inches.

12. The underwater pool lighting system of claim 6, further comprising:

a wall fitting; and conduit, wherein at least the pre-wound portion of the lighting assembly cable is within the conduit.

13. The underwater pool lighting system of claim 12, wherein the conduit is a first conduit having an inner diameter, wherein the underwater pool lighting system further comprises a second conduit for receiving the straight portion of the lighting assembly cable, wherein an inner diameter of the second conduit is less than the inner diameter of the first conduit.

14. The underwater pool lighting system of claim 13, wherein the inner diameter of the first conduit is 1.5 inches and wherein the inner diameter of the second conduit is 1 inch.

15. The underwater pool lighting system of claim 6, wherein the lighting assembly cable comprises a cable connector at an end of the lighting assembly cable, and wherein the cable connector is configured to engage the lighting assembly such that the lighting assembly is detachable from the lighting assembly cable.

16. The underwater pool lighting system of claim 15, wherein the lighting assembly comprising a lighting assembly connector configured to engage the cable connector.

17. The underwater pool lighting system of claim 16, wherein the lighting assembly connector is spaced apart from a housing of the lighting assembly.

18. The underwater pool lighting system of claim 16, wherein the lighting assembly connector is spaced apart from a housing of the lighting assembly by a cable.

19. The underwater pool lighting system of claim 16, wherein the lighting assembly connector is on a housing of the lighting assembly.

20. The underwater pool lighting system of claim 6, wherein the lighting assembly is a nicheless lighting assembly.

21. A swimming pool or spa comprising the underwater pool lighting system of claim 6, wherein the lighting assembly is at least 4 inches below a water line of the swimming pool or spa.

* * * * *